(12) United States Patent
Roll et al.

(10) Patent No.: US 8,419,091 B2
(45) Date of Patent: Apr. 16, 2013

(54) BUMPER FOR AN AUTOMOBILE

(75) Inventors: Michael Roll, Herford (DE); Christian Handing, Langenberg (DE); Martin Schröter, Paderborn (DE); Andreas Schiller, Lippstadt (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/324,439

(22) Filed: Dec. 13, 2011

(65) Prior Publication Data
US 2012/0153645 A1 Jun. 21, 2012

(30) Foreign Application Priority Data
Dec. 15, 2010 (DE) .......................... 10 2010 054 638

(51) Int. Cl.
*B60R 19/03* (2006.01)

(52) U.S. Cl.
USPC ......... 293/120; 296/146.6; 296/205; 293/155

(58) Field of Classification Search .................. 293/120, 293/133, 117, 131, 132, 151, 121, 122, 102; 296/203.02, 203.03, 205, 146.6
See application file for complete search history.

(56) References Cited

U.S. PATENT DOCUMENTS

| | | | |
|---|---|---|---|
| 6,003,912 A * | 12/1999 | Schonhoff et al. ............ 293/122 |
| 6,349,521 B1 | 2/2002 | McKeon | |
| 6,705,668 B1 * | 3/2004 | Makita et al. ............ 296/187.03 |
| 6,893,062 B2 * | 5/2005 | Amano et al. ................ 293/102 |
| 6,918,621 B2 * | 7/2005 | Seksaria ........................ 293/133 |
| 7,044,516 B2 * | 5/2006 | Kobayashi et al. ........... 293/146 |
| 7,100,952 B2 * | 9/2006 | Reierson et al. .............. 293/102 |
| 7,160,491 B2 * | 1/2007 | Barz et al. ..................... 264/46.6 |
| 7,201,413 B2 | 4/2007 | Hillekes et al. | |
| 7,210,719 B2 * | 5/2007 | Honda et al. .................. 293/155 |
| 7,287,788 B2 * | 10/2007 | Caliskan et al. .............. 293/102 |
| 7,357,432 B2 | 4/2008 | Roll et al. | |
| 7,399,013 B2 | 7/2008 | Lütke-Bexten et al. | |
| 7,422,252 B2 | 9/2008 | Gouillart et al. | |
| 7,537,252 B2 * | 5/2009 | Nagai et al. ................... 293/102 |
| 7,926,868 B2 * | 4/2011 | Braunbeck et al. ...... 296/187.03 |
| 8,020,907 B2 | 9/2011 | Wibbeke et al. | |
| 8,079,624 B2 | 12/2011 | Roll et al. | |
| 2004/0130166 A1 | 7/2004 | Trancart | |
| 2008/0083498 A1 | 4/2008 | Handing et al. | |
| 2008/0224487 A1 | 9/2008 | Wang et al. | |

(Continued)

FOREIGN PATENT DOCUMENTS

| | | |
|---|---|---|
| DE | 38 06 724 A1 | 6/1989 |
| DE | 102 52 835 | 2/2004 |

(Continued)

*Primary Examiner* — Glenn Dayoan
*Assistant Examiner* — Pinel Romain
(74) *Attorney, Agent, or Firm* — Henry M. Feiereisen LLC

(57) ABSTRACT

A bumper for an automobile includes a crossbeam which is formed from at least two separate hollow profiles, wherein the hollow profiles abut one another along a longitudinal wall and are joined with one another. The abutting longitudinal walls form a double web oriented in the longitudinal direction of the automobile. The hollow profiles may have an identical cross-sectional configuration. The hollow profiles may be roll-formed or extruded. The modular construction of the crossbeam from separate hollow profiles allows a lightweight construction and allows the load characteristic of the crossbeam to be functionally adapted to different requirements depending on the vehicle or vehicle class.

13 Claims, 3 Drawing Sheets

U.S. PATENT DOCUMENTS

| | | | |
|---|---|---|---|
| 2008/0296919 A1* | 12/2008 | Agrahari | 293/122 |
| 2009/0045638 A1 | 2/2009 | Handing et al. | |
| 2009/0162688 A1 | 6/2009 | Handing et al. | |
| 2009/0243312 A1 | 10/2009 | Handing et al. | |
| 2010/0133859 A1 | 6/2010 | Lütke-Bexten et al. | |
| 2010/0133861 A1 | 6/2010 | Lütke-Bexten et al. | |
| 2010/0181802 A1* | 7/2010 | Schmidt et al. | 296/193.06 |
| 2011/0254294 A1 | 10/2011 | Handing et al. | |

FOREIGN PATENT DOCUMENTS

| | | |
|---|---|---|
| DE | 10 2008 017 055 A1 | 10/2009 |
| EP | 1 378 402 | 1/2004 |
| EP | 2 150 453 B1 | 12/2010 |
| JP | 2004 262 300 A | 9/2004 |

* cited by examiner

BUMPER FOR AN AUTOMOBILE

CROSS-REFERENCES TO RELATED APPLICATIONS

This application claims the priority of German Patent Application, Serial No. 10 2010 054 638.0, filed Dec. 15, 2010, pursuant to 35 U.S.C. 119(a)-(d), the content of which is incorporated herein by reference in its entirety as if fully set forth herein.

BACKGROUND OF THE INVENTION

The present invention relates to a bumper for an automobile with a crossbeam which can be attached transversely in relation to the side rails of the automobile frame.

The following discussion of related art is provided to assist the reader in understanding the advantages of the invention, and is not to be construed as an admission that this related art is prior art to this invention.

Bumpers are installed in automobiles both on the front side as well as on the rear side as standard equipment, for absorbing impact energy from minor impacts, so as to prevent if possible damage to the actual supporting structure of the automobile. A bumper includes a crossbeam which can typically be attached transverse to the side rails of the automobile frame via interposed crash boxes. The crossbeam is used to introduce the energy resulting from an impact into the crash boxes, where the impact energy is to be converted into deformation energy. The system is thereby designed so that the crash boxes are located as close to the center on the side rail of the automobile as possible and the impact energy is introduced into the crash boxes via the crossbeam and thus to the side rails with the smallest possible bending torque.

The bumpers must satisfy the regulatory requirements which in Europe are part of the type approval, as well as the demands placed by the consumer protection organizations for pedestrian protection. In addition, the requirements from the grading tests of the insurers (RCAR, GDV) must be satisfied. The automobile manufacturers also have their own requirements regarding optimal use of the installation space, ease of assembly, high energy absorption capability and smallest possible weight as well as acceptable costs. The desire to reduce the $CO_2$ emission also demands a consequent implementation of lightweight construction in the vehicle development. However, the desired weight reduction and the required insurance grading tests almost contradict each other.

It would therefore be desirable and advantageous to obviate prior art shortcomings and to provide an improved bumper which can be easily produced, which is lightweight and has improved functionality, in particular with respect to the loading characteristic, and which can be designed for different vehicle classes through simple modifications.

SUMMARY OF THE INVENTION

According to one aspect of the present invention, a bumper according to the invention has a crossbeam formed of at least two separate longitudinal profiles, wherein the longitudinal profiles abut each other along a longitudinal wall, producing a double web that is oriented in the longitudinal direction of the automobile (x-axis), wherein the longitudinal profiles are connected with each other. The crossbeam has a modular construction, so that the entire system can be assembled from individual standardized longitudinal profiles. The individual longitudinal profiles can be combined in different ways to form a complete crossbeam. In this way, a lightweight crossbeam with a different resistance moment and bending stiffness can be designed. By combining longitudinal profiles with application-specific designs, the crossbeam can be adapted to the regulatory requirements and grading tests required for the different vehicle types.

According to an advantageous feature of the present invention, the double web which may be oriented in the vehicle direction and may preferably extend over the entire length of the crossbeam contributes to a high bending stiffness of the crossbeam.

The crossbeam according to the invention can advantageously be manufactured from identically constructed components. In addition, low development costs and simple installation processes are attained. Faster product cycles can also be realized.

According to an advantageous feature of the present invention, the longitudinal profiles are hollow profiles.

The longitudinal profiles may have identical cross-sectional configuration. In this case, the crossbeam is in particular constructed symmetric with respect to its cross-sectional center plane. However, the individual longitudinal profiles may also have mutually different cross-sectional configurations. The longitudinal profiles may have different cross-sectional areas in vertical cross-section. In this case, the double web then extends outside the transverse center plane.

According to an advantageous feature of the present invention, the cross-sectional area of at least one longitudinal profile may also vary in the longitudinal direction of the longitudinal profile. It is also possible that one or each longitudinal profile has at least partially different wall thicknesses and/or that the longitudinal profiles have mutually different wall thicknesses.

According to an advantageous feature of the present invention, roll-formed longitudinal profiles or extruded longitudinal profiles may be used for producing the crossbeam from separate individual longitudinal profiles. The longitudinal profiles may be joined to one another, in particular abut each other over an area or contact each other along a line. The hollow profiles may be joined by a positive and/or a non-positive connection and/or by a material connection. Longitudinal profiles made of steel may be joined by welding. A combination of different joining techniques, such as welding and gluing, is also possible. As already mentioned, the longitudinal profiles are in particular hollow profiles.

According to an advantageous feature of the present invention, extruded longitudinal profiles or hollow profiles may be constructed from light-metal materials, such as aluminum and aluminum alloys. Longitudinal profiles made of aluminum may be joined with one another with an adhesive, or non-positively and positively. A positive joint may be implemented so as to be releasable, for example in form of a dovetail joint or a groove-spring joint. Alternatively or in addition, longitudinal profiles may also be encompassed, for example by clamping, at least in sections by an exterior reinforcement component. A non-releasable joint may be implemented by clinching.

As already mentioned above, the longitudinal profiles may be made from steel or light-metal materials. Fundamentally, a combination of longitudinal profiles made from different materials is also feasible.

Particularly suited for practical applications are longitudinal profiles made of steel with a yield strength $R_e$ greater than or equal to ($\geq$) 500 N/mm². The longitudinal profiles made from aluminum or from an aluminum alloy have preferably a yield strength $R_e$ greater than or equal to ($\geq$) 300 N/mm². The wall thicknesses of the longitudinal profiles are between 1 mm and 3 mm.

By assembling the crossbeam from two separate longitudinal profiles, the material is doubled in the region of the abutting longitudinal walls, thereby forming a double web. According to an advantageous feature of the present invention, the double web extent in the x-y plane of the crossbeam. According to another advantageous feature of the present invention, the double web may be arranged in the center of the crossbeam. The double web then forms the center web of the crossbeam. The crossbeam thereby attains a high stiffness especially in the center region.

The system can be optimally adapted for the appropriate loads through the geometric design of the crossbeam. According to an advantageous feature of the present invention, the crossbeam may be at least partially curved along its length.

For reducing the weight, openings may be provided at a suitable locations or regions in the walls of the crossbeam. The crossbeam may also have openings in form of functional openings, for example for passing through a tow hook and the like.

According to an advantageous feature of the present invention, the back side of the crossbeam oriented towards the automobile may also be at least partially open. The partial openings in the back side of the crossbeam may also be combined with additional recesses and openings in the walls of the crossbeam.

According to an advantageous feature of the present invention, the crossbeam may have a front side which transitions via upper end lower inclined surfaces into connected upper and lower skirts. The rear wall sections of the longitudinal profiles which form the backside of the crossbeam connect to the respective skirts.

The crossbeam may not be curved along its length. Advantageously, the crossbeam may be curved along its length (y-axis of the automobile). A radius of curvature greater than or equal to ($\geq$) 1500 mm may be advantageous.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
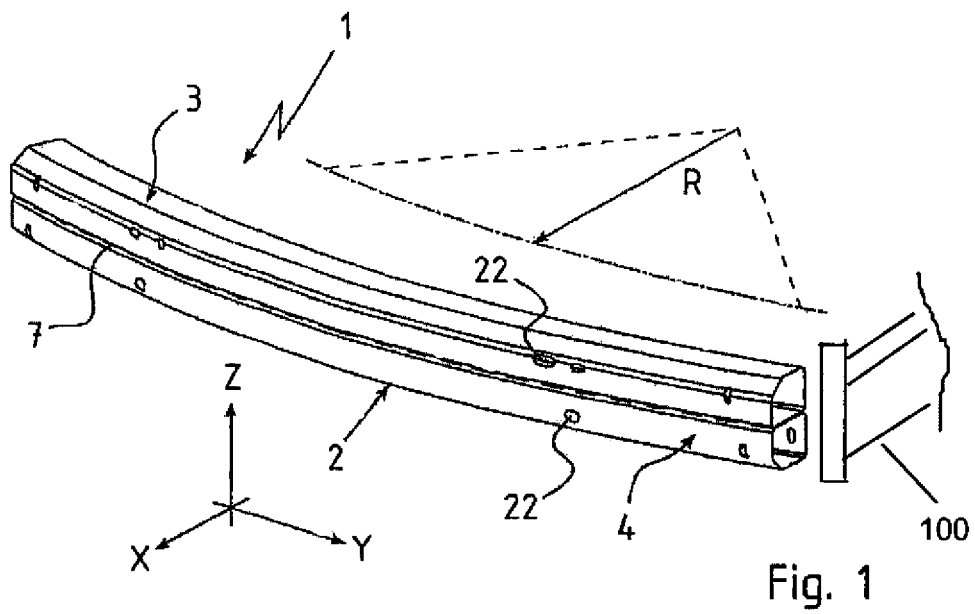
FIG. 1 shows, in a perspective view, a crossbeam of an automobile bumper is according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a bumper 1 according to the invention for an automobile which is not shown in detail. The bumper 1 includes a crossbeam 2 which can be attached transversely to side rails of an automobile, shown schematically as 100 in FIG. 1. The crossbeam 2 is typically supported on the side rails by also unillustrated crash boxes. The crash boxes are intended to absorb, in addition to the crossbeam 2, the energy resulting from an impact by converting the energy into deformation energy.

FIG. 1 also indicates the coordinate system X, Y, Z of an automobile which will be used in the following description. The x-axis designates the longitudinal direction of the automobile, the y-axis designates the transverse direction of the automobile, and the z-axis designates the vertical direction of the automobile.

Figure 2:
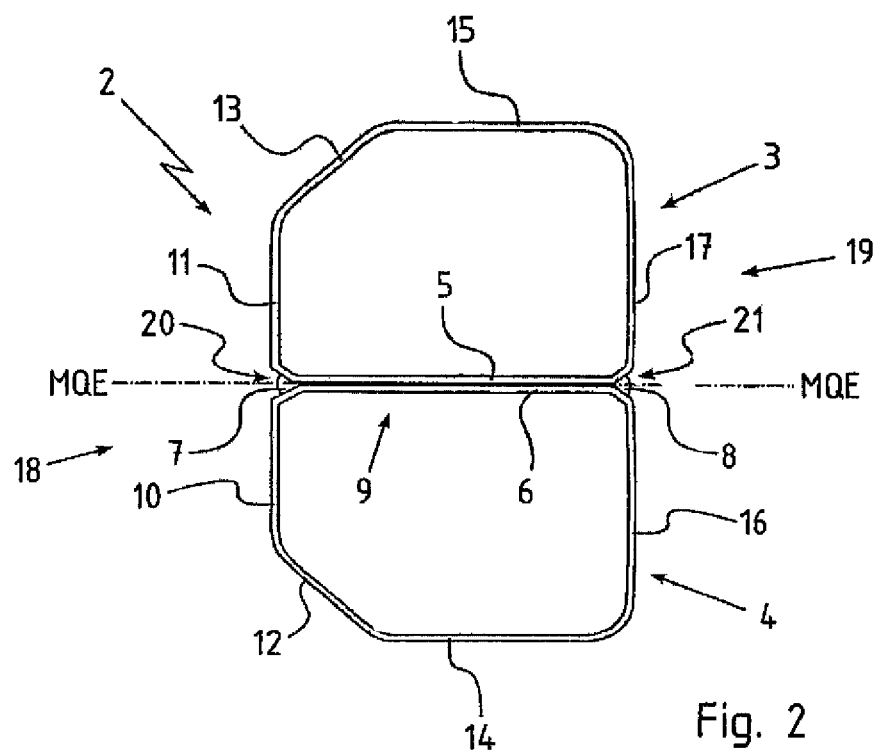
FIG. 2 shows the crossbeam according to FIG. 1 in a cross-sectional view.

As seen in particular also in FIG. 2, the crossbeam 2 is formed from two separate longitudinal profiles in the form of hollow profiles 3, 4. The hollow profiles 3, 4 abut one another over an area along the longitudinal walls 5, 6 and are joined together. This is done with a weld joint 7, 8. The weld joint 7, 8 can be implemented, as illustrated in FIG. 1, along sections in form of an interrupted weld seam. The two abutting longitudinal walls 5, 6 which contact each other form a double web 9 which is oriented in the longitudinal direction (X) of the automobile.

The double web 9 extends in the transverse direction (Y) across the entire length of the crossbeam 2.

The hollow profiles 3, 4 are made from steel and are roll-formed. The hollow profiles 3, 4 can also be made from a light-metal material, in particular aluminum or an aluminum alloy, and may be extruded.

FIG. 1 also illustrates that the crossbeam 2 is curved along its length. The radius of curvature R is preferably greater than or equal to ($\geq$) 1500 mm.

Each hollow profile 3, 4 has a constant, substantially pentagonal cross-sectional configuration along its entire length. The hollow profiles 3, 4 are identical or structurally identical and are arranged symmetrically in relation to a transverse center plane MQE OF the crossbeam 2. The double web 9 is formed congruent with the transverse center plane MQE OF the crossbeam 2.

Each hollow profile 3, 4 has a front wall 10, 11 which transitions via an inclined surface 12, 13 into a skirt 14, 15, to which a respective rear wall 16, 17 is connected. The front wall 10 and 11, respectively, and the rear wall 16 and 17, respectively, are each connected by way of the longitudinal wall 5, 6. The two longitudinal walls 5, 6 abut one another and are joined. The two longitudinal walls 5, 6 thereby form the reinforced double web 9. The front walls 10, 11 form the front side 18 of the crossbeam 2. The rear walls 15, 16 form the rear side 19 of the crossbeam 2 facing the automobile. The respective transitions from the front wall 10, 11 via the inclined surface 12, 13 to the skirt 14, 15 and from there to the rear wall 16, 17 of the respective hollow profile 3, 4 are rounded. A gusset 20, 21 is formed on the front side and the backside between the contacting hollow profiles 3, 4. The weld joint 7, 8 is implemented in the gussets 20, 21.

FIG. 1 also shows openings 22 provided in the walls of the crossbeam 2 and in the hollow profiles 3, 4, in particular in the front walls 10, 11. The openings 22 are used as functional openings for assembly and disassembly and for passing through other components, such as tow hooks. In addition, openings for reducing the weight can be arranged in those regions of the crossbeam 2 where a weakening of the material is noncritical for the loading characteristic.

Figure 3:
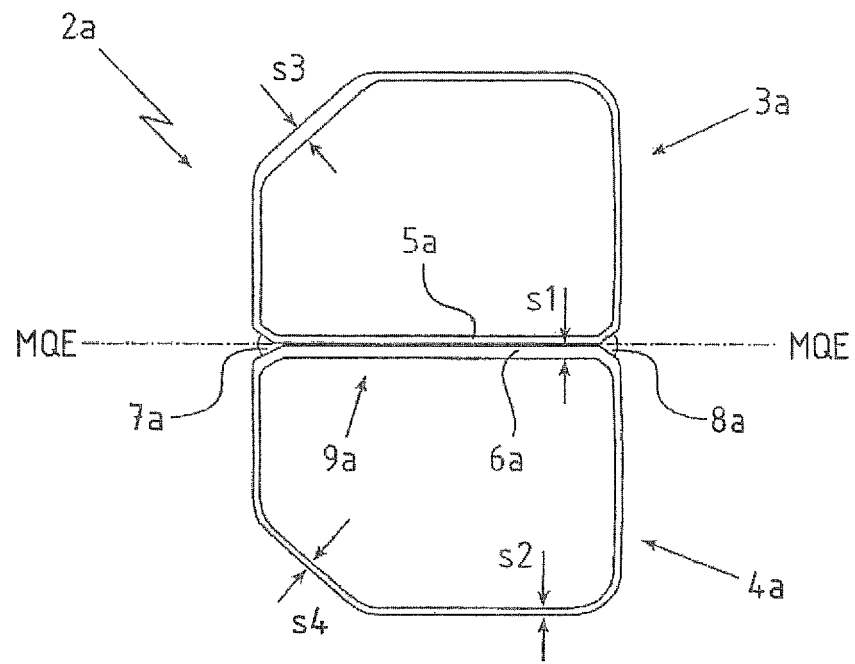
FIGS. 3 to 6 show in a vertical cross-sectional view additional embodiments of a crossbeam.

FIG. 3 shows an alternative embodiment of the crossbeam 2a which is constructed from two separate longitudinal profiles in form of the hollow profiles 3a, 4a, which abut each other along a longitudinal wall 5a, 6a and which are joined together. The longitudinal walls 5*a*, 6*a* which are joined by way of weld joints 7*a*, 8*a* form a double web 9*a* oriented in the longitudinal direction (X) of the automobile.

As can be seen, each of the hollow profiles 3*a*, 4*a* has partially different wall thicknesses s1, s2. In addition, the hollow profiles 3*a*, 4*a* have mutually different wall thicknesses s3, s4.

Preferably, the hollow profiles 3*a*, 4*a* of the crossbeam 2*a* are made from a light-metal material and are extruded. They can be joined positively by a weld joint or by an adhesive joint. Fundamentally, a non-positive and/or positive joint is also feasible.

Figure 4:
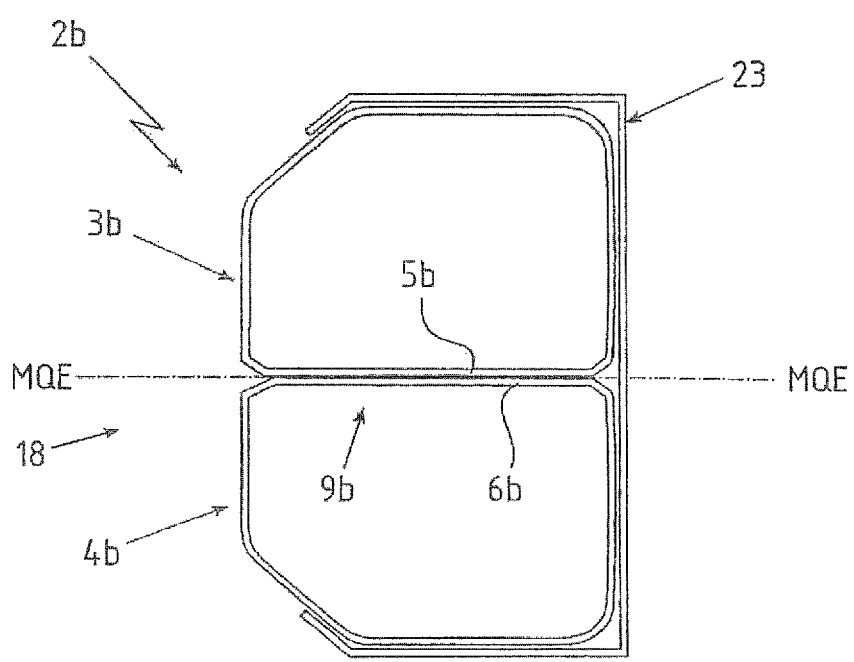

In the embodiment of a crossbeam 2*b* illustrated in FIG. 4, longitudinal profiles in form of hollow profiles 3*b*, 4*b* are used which correspond essentially to the configuration of the hollow profiles 3, 4 illustrated in FIG. 2. The longitudinal walls 5*b*, 6*b* also abut each other and form a double web 9*b*. The longitudinal profiles 3*b*, 4*b* of the crossbeam 2*b* are encompassed by an exterior reinforcement component 23 and are connected with one another in this way. The reinforcement component 23 is constructed as a clamp and is open at a front side. A weld joint of the hollow profiles 3*b*, 4*b* can be omitted, depending on the particular embodiment. Only a single weld joint at the front side 18 may be required.

Figure 5:
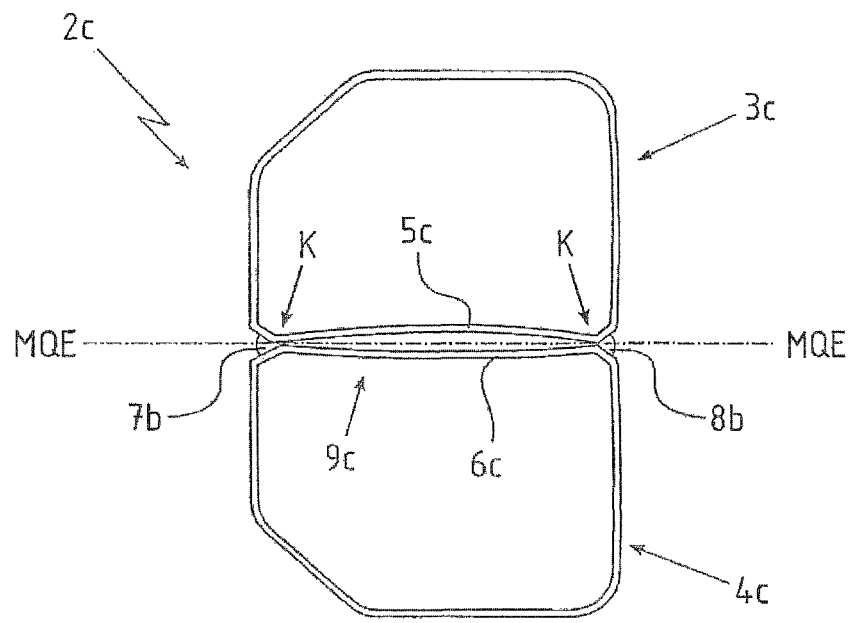

FIG. 5 shows a crossbeam 2*c*, formed from a hollow profile 3*c* and a hollow profile 4*c*. The hollow profiles 3*c*, 4*c* have curved longitudinal walls 5*c*, 6*c*. The longitudinal wall 5*c* is curved upwards in the vertical direction z of the automobile, whereas the longitudinal wall 6*c* is curved downward in the opposite direction. This configuration has advantages in production, because a spring-back of the material after rolling of the hollow profiles 3*c*, 4*c* is compensated. The hollow profiles 3*c*, 4*c* contact each other along a line in the contact region K and are joined to each other. The joint is provided by a front and a rear side weld joint 7*b*, 8*b*. The longitudinal walls 5*c*, 6*c* hereby also form a double web 9*c* with a doubled material thickness oriented in the longitudinal direction (X) of the automobile.

Figure 6:
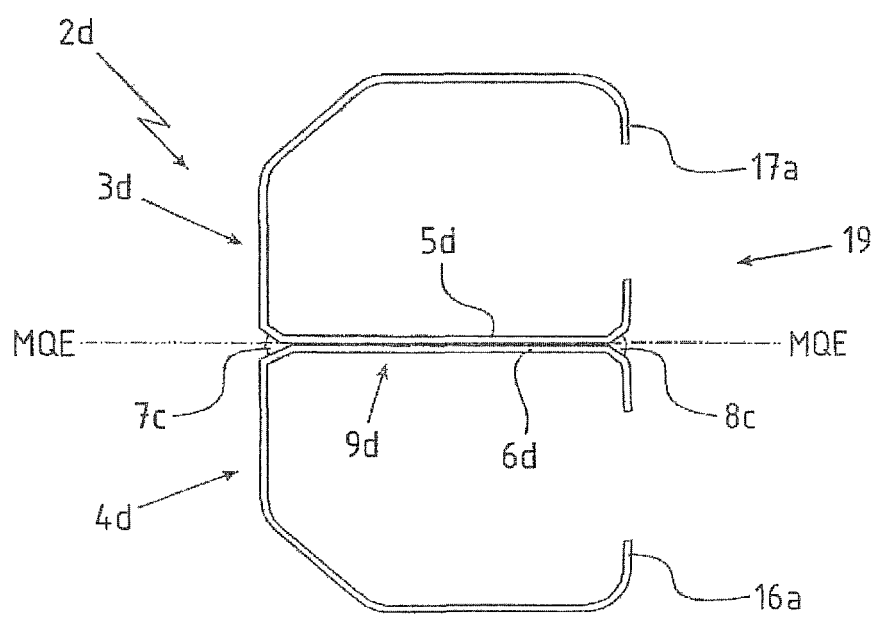

The crossbeam 2*d* illustrated in FIG. 6 is constructed from two longitudinal profiles 3*d*, 4*d* which abut one another with their longitudinal walls 5*d*, 6*d*, thereby forming a double web 9*d* oriented in the longitudinal direction (X) of the automobile. The contact region K of the longitudinal walls 5*d*, 6*d* is two-dimensional. The longitudinal profiles 3*d*, 4*d* are joined by weld joints 7*c*, 8*c*.

In contrast to the aforedescribed embodiments of the crossbeams 2, 2*a*-*c*, the longitudinal profiles 3*d*, 4*d* of the crossbeam 2*d* are at least partially open on their rear walls 16*a*, 17*a* located at the rear side 19. Preferably, the longitudinal profiles 3*d*, 4*d* are rolled profiles.

In all embodiments of the crossbeam 2, 2*a*-*d*, the double web 9, 9*a*-*d* is formed so as to be congruent with the transverse center plane MQE of the crossbeam 2, 2*a*-*d*.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A bumper for an automobile, comprising a crossbeam defining a length and a transverse center plane and being constructed symmetrically with respect to the transverse center plane, wherein the crossbeam is at least partially curved along the length and comprises openings disposed in walls of the crossbeam and is formed from at least two longitudinal profiles having a longitudinal direction and configured for attachment transversely to side rails of an automobile frame defining a longitudinal direction of the automobile frame, wherein at least one longitudinal profile is roll-formed, said at least two longitudinal profiles comprising longitudinal walls, wherein the longitudinal walls of adjacent longitudinal profiles abut each other so as to form a double web congruent with the transverse center plane and oriented in the longitudinal direction of the automobile frame and wherein the abutting longitudinal profiles are connected with one another, the bumper further comprising an exterior reinforcement component constructed as a clamp having legs oriented in the longitudinal direction of the automobile frame away from the automobile frame and at least partially encompassing the at least two longitudinal profiles so as to hold the at least two longitudinal profiles together along the double web in absence of additional fasteners.

2. The bumper of claim 1, wherein the at least two longitudinal profiles are hollow profiles.

3. The bumper of claim 1, wherein the at least two longitudinal profiles have an identical cross-sectional configuration.

4. The bumper of claim 1, wherein the at least two longitudinal profiles have mutually different cross-sectional configurations.

5. The bumper of claim 1, wherein at least one longitudinal profile is extruded.

6. The bumper of claim 1, wherein at least one longitudinal profile has at least partially different wall thicknesses.

7. The bumper of claim 1, wherein at least two of the at least two longitudinal profiles have mutually different wall thicknesses.

8. The bumper of claim 1, wherein a cross-sectional area of at least one longitudinal profile varies in the longitudinal direction of the longitudinal profile.

9. The bumper of claim 1, wherein the at least two longitudinal profiles are made from mutually different materials.

10. The bumper of claim 1, wherein the longitudinal profiles are joined with one another by at least one of a positive connection, a non-positive connection and a material connection.

11. The bumper of claim 1, wherein the crossbeam has a rear side facing the automobile, said rear side being at least partially open.

12. The bumper of claim 1, wherein the longitudinal walls of abutting longitudinal profiles contact each other over an area.

13. The bumper of claim 1, wherein the longitudinal walls of abutting longitudinal profiles contact each other along a line.

* * * * *